May 12, 1931.  J. SCHOBER  1,805,317
TRAP FOR BEASTS OF PREY
Filed Aug. 27, 1929
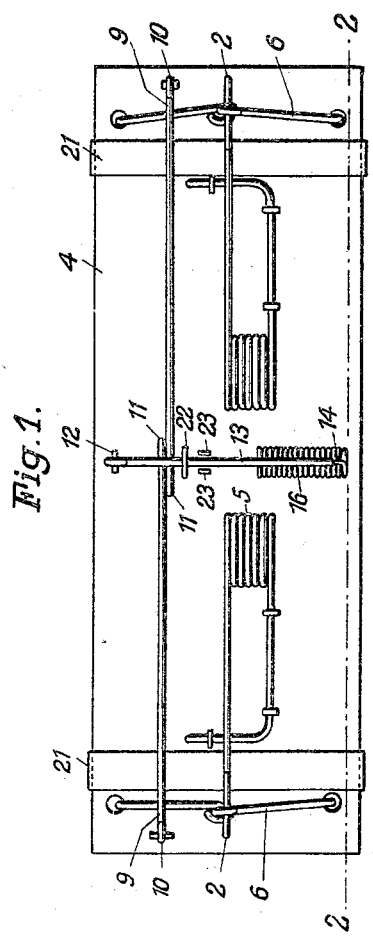
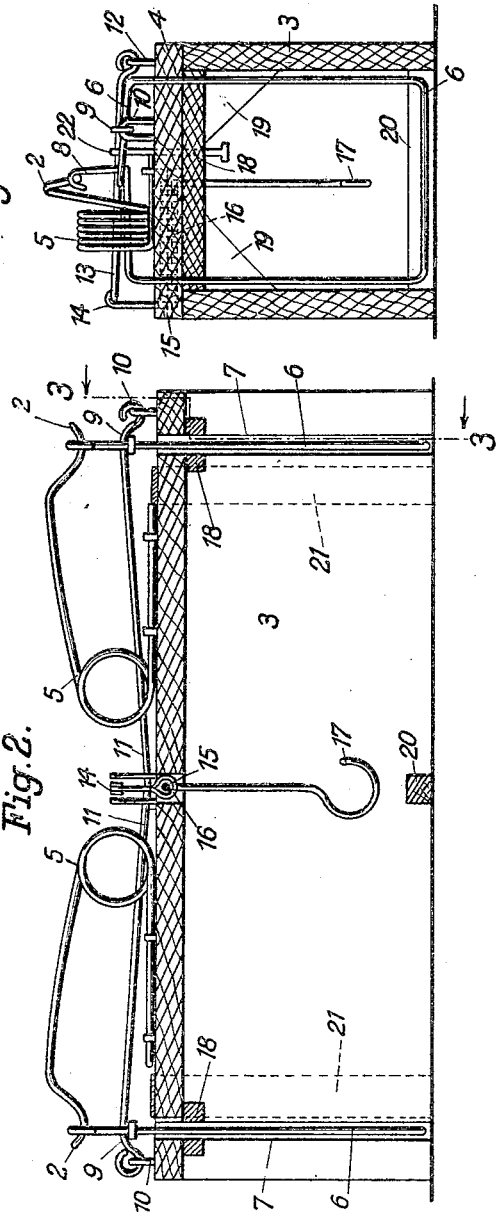
Inventor:
Johann Schober Patented May 12, 1931

1,805,317

UNITED STATES PATENT OFFICE

JOHANN SCHOBER, OF KLEINHOLZHAUSEN POST GROSSHOLZHAUSEN, NEAR ROSENHEIM, GERMANY

TRAP FOR BEASTS OF PREY

Application filed August 27, 1929. Serial No. 388,836.

This invention relates to a trap for beasts of prey with two catching bows one arranged near each end inside the housing. The two bows in operative position are each under the action of a strong spring under tension, said bows, at simultaneous releasing of the springs, being jerked upwards through the roof of the housing so that the animal is trapped by one of the bows and held between this bow and the roof of the housing in such a manner that self-liberation is impossible. The release of the two tensioned springs is effected by a spiral portion movable on a stationary axis extending at one end to the bait hook situated between the two catching bows and at the other end to the catch of a locking device, so that, as soon as the bait hook even at the lightest touch is moved and releases the lock, the bows spring up and the animal is trapped.

An embodiment of the invention is illustrated by way of example in the accompanying drawings in which:—

Fig. 1 is a top plan view of the trap,

Fig. 2 is a longitudinal section on line 2—2 of Fig. 1.

Fig. 3 is a cross-section on line 3—3 of Fig. 2.

The oblong housing has two longitudinal side walls 3 and a roof 4. The housing is open at the two narrow ends so that the animal can enter from either end in order to reach the bait suspended in the centre of the housing.

Independent springs 5 are shown in tensioned position. Catching bows pass through the roof 4 and are capable of sliding in guides 7 provided in the side walls 3. The end 2 of each of the springs 5 engages in a hook 8 of one of the catching bows respectively, and being under tension, tends to pull up the catching bow with which it is connected. This is prevented by two steel wire, locking bars 9 which are each hinged on the roof 4 at a point 10 on a level slightly below that of the edge of the bow over which it engages thereby forming a strongly resilient lever with very unequal arms. The longer arm of each of these levers is again locked by a transverse bar 13 preferably of circular cross-section, arranged at right angles to the ends 11 and hinged at 12. The locking bars 9 are only of such length that, as soon as the transverse bar 13 is released from the locking hook 14 and rises at one side under the action of the resilient locking bars 9 continually pressing against same, the locking bars 9 also spring up around the hinge 10 and thereby suddenly release the bows 6 and the springs hitherto under tension, whereby at the same instant the catching bows are wrenched upward and tend to press the animal against the roof 4. The locking of the transverse bar 13 is effected by a spiral spring 16 loosely mounted on an axle 15 and forming at one end a locking hook 14 and at the other end a bait hook 17. The release takes place as soon as the bait is lightly touched.

18, 19 and 20 are reinforcements arranged inside the housing and 21 are bands extending around the casing on the outside over the roof 4 and the sides 3 so as to impart a certain rigidity.

For rendering the trap inoperative a safety hook 22 is provided capable of engaging over the transverse bar 13 and used only while the trap is being set. 23 are guides for the transverse bar 13 serving to prevent lateral displacement.

As compared with iron traps this apparatus presents the advantage that it cannot freeze. It can naturally be concealed with foliage and twigs and secured on a chain in order to prevent its being dragged away, although this need not be feared as the animal is trapped in such a manner that in most instances it cannot move from the spot.

The size of the trap and the most suitable baits are selected according to the kind of beasts to be caught. The hook 17 must naturally be entirely hidden by the bait.

I claim:—

A trap for beasts of prey comprising a housing open at the two ends and having guide grooves, two catching bows arranged one near each end inside said housing and adapted to slide in said grooves, springs mounted on the roof of said housing and tending to force said bows upwards towards the roof of said casing, two locking bars hinged one at each end and extending towards the middle of the roof of said housing and adapted to hold said bows in lowered position against the action of said springs when the trap is set, a transverse bar hinged on said roof and adapted to bear on the free ends of said locking bars, an axle mounted in the middle of the roof, a spiral spring mounted on said axle, a bait hook formed by one end of said spring extending inside said housing, and a catch formed by the other end of said spring adapted to engage said transverse bar in lowered position against the action of the first named spiral springs transmitted through said bows and said locking bars.

In testimony whereof I affix my signature.

JOHANN SCHOBER.